Dec. 18, 1945.  P. S. MADSEN  2,391,063
HOSE COUPLING
Filed May 22, 1943  2 Sheets-Sheet 1

Inventor
Paul S. Madsen
By Rockwell & Bartholow
Attorneys

Dec. 18, 1945.  P. S. MADSEN  2,391,063
HOSE COUPLING
Filed May 22, 1943  2 Sheets-Sheet 2

Inventor
Paul S. Madsen
By Rockwell Bartholow
Attorneys

Patented Dec. 18, 1945

2,391,063

UNITED STATES PATENT OFFICE 2,391,063

HOSE COUPLING

Paul S. Madsen, Bethany, Conn., assignor to The Seamless Rubber Company, New Haven, Conn., a corporation of Connecticut Application May 22, 1943, Serial No. 488,019

10 Claims. (Cl. 285—21)

This invention relates to hose couplings and has particular application to hose couplings adapted to be used in aircraft where easy and quick disconnection of the coupling members is important while, nevertheless, there is effective sealing against leakage during the time that the coupling parts are interconnected.

Detachable connectors are used in carrying air from a fixed distributing conduit in the aircraft to the aviator's suit or other equipment worn or carried by the aviator, and it is desirable that the hose associated with the aviator's suit have an outer end carrying a coupling member adapted to be interconnected to a coupling member on the fixed air line of the craft whereby a supply of air is furnished to the aviator's equipment under normal conditions although the coupling is easily disconnectable when it is necessary to bail out.

One of the objects of my invention is to provide a detachable connector which can be satisfactorily used for the above-mentioned purpose and similar purposes.

Another object is to provide a connector which is reliable in its operation and which is of a character such that it will withstand hard usage.

Another purpose which I have in view is to conserve as far as possible the air hose of elastic material by relieving it of damaging strains and wear.

To these and other ends the invention consists in the novel features and combination of parts to be hereinafter described and finally pointed out in the claims.

Figure 1:
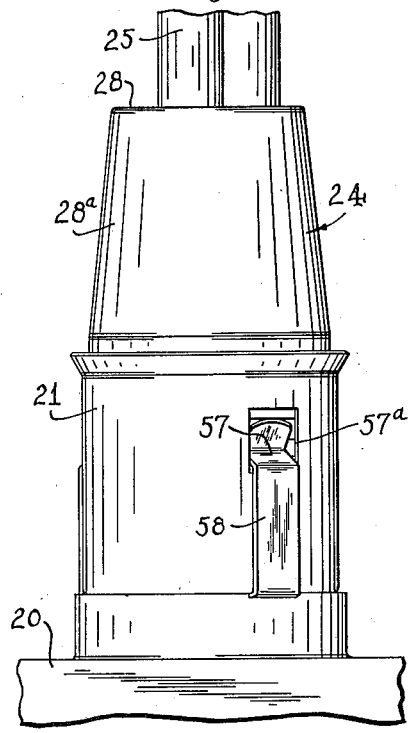
Fig. 1 is a side elevation of a hose coupling embodying my invention.

Although the number of hose or tubes adapted to be coupled by the connector may be considerably varied, the device shown in the drawings is constructed for the purpose of effecting connection of three elastic air tubes associated with an aviator's suit, to a fixed air line in aircraft having air ducts to which the respective tubes are connected. The tubes usually hang down from the suit or other equipment and at their lower ends are attached to a common coupling member adapted to have quick-detachable connection with a coupling member common to the air ducts of the air line. This last-mentioned coupling member may be referred to as the fixed member and the one attached to the tubes may be referred to as the movable or detachable member. Associated with the fixed member is an upstanding enclosing shell, usually of metal, having resilient devices to engage the movable member and hold it firmly in assembled coupled position. The upper coupling member has associated with it an elastic connector member which has the function of connecting the elastic tubes to an upper ported coupling element and of enclosing the connection between the tubes and this element. The ported coupling element of the upper coupling member cooperates with a ported coupling element of the lower coupling member, which lastnamed coupling element is seated, in this particular instance, within the lower portion of the above-mentioned shell.

In the drawings, the fixed member of the assemblage in which the air supply ducts are formed is shown at 20, the metal shell extending upwardly therefrom at 21, and the lower coupling element positioned within the bottom portion of the shell at 22. This element at 22, which is a ported element having ports registering with ducts in member 20, is adapted to be connected to a ported element 23. The element 23 is a part of the upper coupling member which upper member also includes an elastic connector member 24 in the nature of an enclosing and strain-relieving jacket providing a mechanical connection between element 23 and the three elastic tubes 25.

Figure 3:
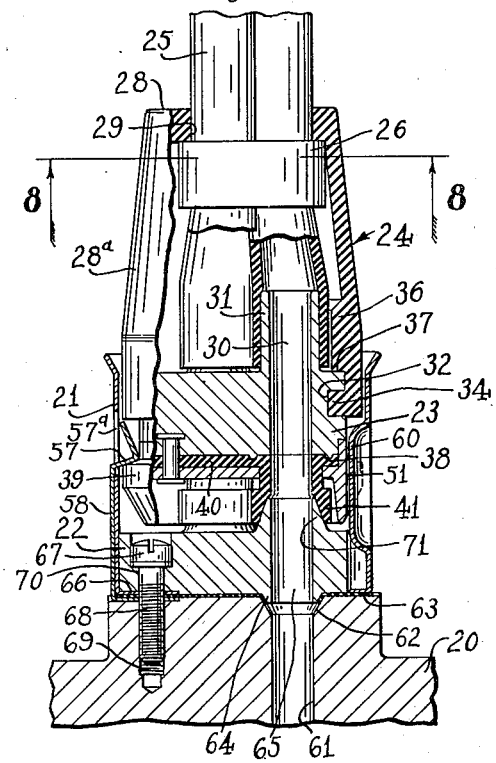
Fig. 3 is a longitudinal section, some of the parts being broken away.
Figure 2:
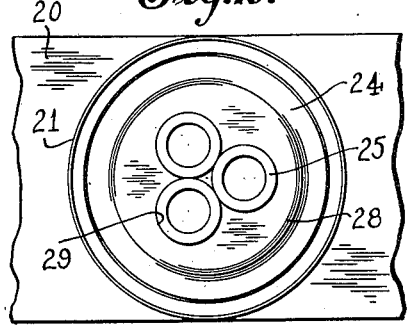
Fig. 2 is a top plan view of the device shown in Fig. 1.
Figure 4:
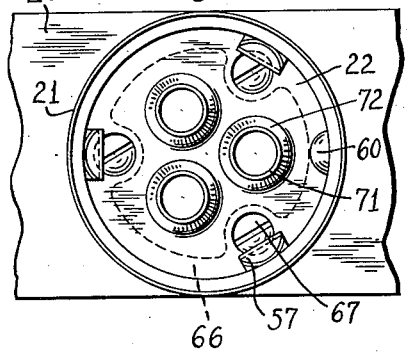
Fig. 4 is a plan view similar to Fig. 2, the upper part of the coupling being removed.
Figure 8:
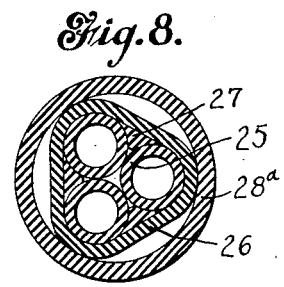
Fig. 8 is a section on line 8—8 of Fig. 3.
Figure 9:
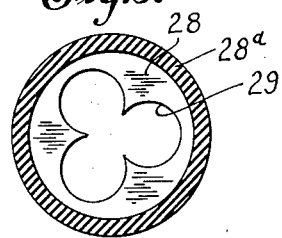
Fig. 9 is a section on line 9—9 of Fig. 7.

The elastic tubes 25 of rubber or like material depending from the aviator's suit have their lower terminal portions brought together in triangular arrangement and held firmly together in permanent fashion at a point spaced from the extreme lower ends of the tubes by appropriate means such as a relatively hard rubber band 26 snugly embracing the tubes and certain spacing rubber parts 27 (Fig. 8), the whole being held together by cementing or otherwise in order to form on the tubes an integral generally triangular shouldered enlargement. The jacket 24 is a hollow elastic member of rubber or like material with relatively thick walls including a round upper wall 28 having a cutout portion 29 of cloverleaf shape adapting it to conform to the outer surfaces of the elastic tubes in a locality just above the collar 26, the upper surface of said collar 26 abutting the lower surface of wall 28 over a considerable area so that upward strain imposed on the upper portions of the tube (Fig. 3) will be transmitted through collar 26 to the wall 28. The wall 28 is connected by an integral elastic sidewall 28ª, preferably of conical shape throughout a part of its length, to the coupling element 23. The coupling element 23 is preferably made of molded plastic material such as a synthetic resin and is provided with vertical ports 30 which adjacent their upper end portions are formed within rigid integral upwardly extending sleeves 31 with which the element 23 is provided. These sleeves 31 serve as a means of connecting the ports of element 23 to the lower ends of the rubber tubes 25, and for this purpose the lower terminals of the tubes are expanded and forced over the sleeves 31, as shown in Fig. 3.

The member 23 is a round member of the nature of a thick disc having in its periphery a groove 32 in which is engaged an inwardly extending lip or flange 34 provided upon the jacket 24. The lower end of the jacket is left open, as indicated at 35 in Fig. 7, and the jacket can be stretched over the element 23 in order to secure the parts firmly together, the flange 34 being received in groove 32 and there being a thickened portion 36 on the jacket wall having a shoulder 37 engaged with the upper surface of element 23 around its periphery.

To the lower surface of the element 23 is attached a soft rubber member generally indicated at 38 adapted to cooperate with element 22 in forming a seal, and held in place relatively to element 23 by a securing member generally indicated at 39. Preferably, the members 39 and 22, as well as member 23, are formed of molded plastic material.

Figure 7:
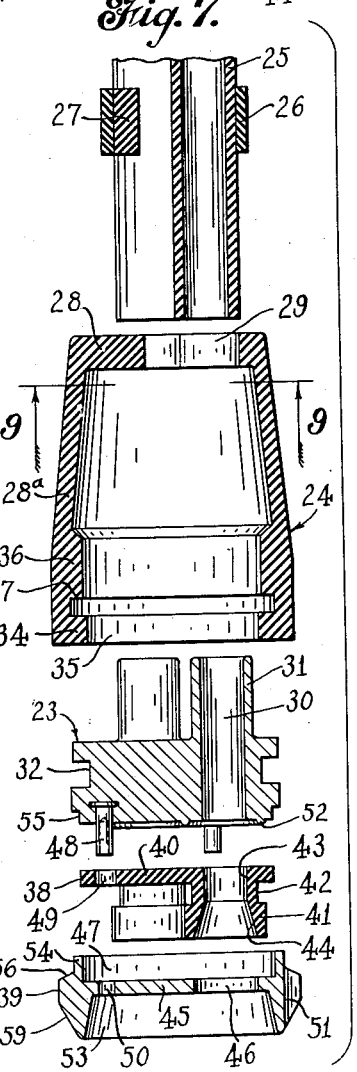
Fig. 7 is an exploded view showing the principal parts of the upper coupling member.
Figure 10:
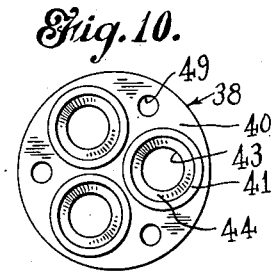
Fig. 10 is a detail bottom plan view of the soft rubber element carrying the downwardly projecting nipples.

The soft rubber member 38 preferably has the form shown in Figs. 7 and 10, and comprises a round web 40 of soft vulcanized rubber having three nipples 41 projecting downwardly therefrom, each of these nipples being provided intermediate of its ends with an external annular groove 42. By this arrangement the lower ends of the soft rubber nipples are externally shouldered as shown in Fig. 7. Each of these nipples has in the upper portion thereof a cylindrical bore 43 and in the lower part thereof a conical flaring mouth portion 44. Member 38 is adapted to be secured to element 23 by the molded member 39 which has a web 45 with perforations 46 in which the shanks of nipples 41 are accommodated. The web portion 40 of the soft rubber member lies in a cupped portion 47 at the upper part of member 39, and nipples 41 are projected through perforations 46, the web 45 having portions disposed in the upper portions of the grooves 42 in a manner shown in Fig. 3 so that the lower flared mouth portion of each nipple is free to have a certain amount of vertical movement. After the assembly of member 38 with members 39 and 23, the parts are held in assembled position by upsetting the lower ends of metal rivets 48 projecting downwardly from member 23 and having their upper ends anchored in said member, said rivets passing through perforations 49 in soft rubber member 38 and perforations 50 in member 39. The member 39 is provided in at least one place with a peripheral notch 51 for a purpose to be hereinafter described.

Figure 5:
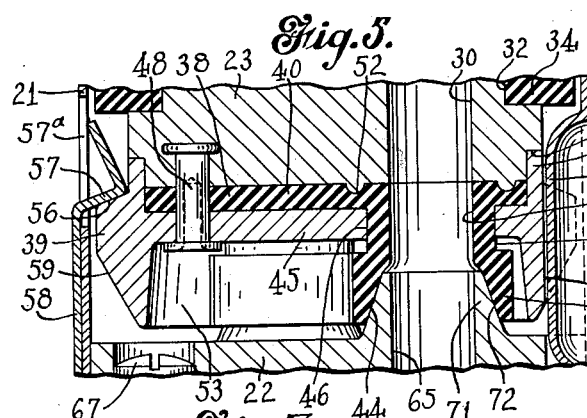
Fig. 5 is a fragmentary vertical section on a larger scale, showing the relation of some of the parts in coupled position.
Figure 6:
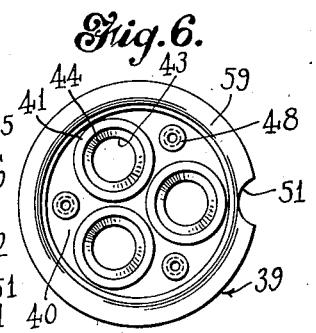
Fig. 6 is a bottom plan view of the upper member of the coupling as it appears detached from the lower member.

It will be seen that when the soft rubber member 38 and the harder members 39 and 23 are assembled together in the relation shown in Fig. 5, the web portion of the soft rubber member is compressed and held firmly against the lower surface of member 23. The port 30 of member 23 is of the same diameter and in registry with the bore 43, and in order to insure against leakage of air between member 23 and member 38 the lower surface of member 23 is provided with a small downwardly projecting annular rib 52 that is pressed into the upper surface of the soft rubber web around the port 30.

It will also be noted that the lower ends of the rubber nipples project downwardly in a space 53 at the lower part of member 39. The member 39 is of somewhat larger diameter than member 23 and has an upwardly extending flange 54 engaging a rabbet 55 on member 23. Outwardly of the flange 54 member 39 is provided with a slanting locking shoulder 56 adapted to cooperate with an angular lug portion 57 carried by an upstanding spring member 58 associated with the shell 21. On the lower peripheral portion of member 39 the same has a slanting surface 59 whereby it is provided with a ring-like wedge which when the upper coupling member is forced down into the socket of the shell forces the spring outwardly preliminary to the snapping of the lugs 57 into engagement with the locking shoulder 56. It is preferred to use three of the locking springs 58, these being spaced from each other at equal distances circumferentially of the shell, but this number may be varied if desired. The shell is also preferably provided with means for locating the upper member of the coupling in proper angular relation to the lower member. In preferred form, the shell is provided at one point in its circumference with an inwardly pressed or bent portion 60, providing a vertical rib with which the notch 51 previously mentioned is engaged when the upper member of the coupling is thrust downwardly into its socket.

The shanks of the upstanding spring members 58 are preferably located at the outer face of the socket or shell but their lug portions 57 extend into the interior of the socket through openings 57ª in the shell.

The member 20 in which the air supply ducts are formed may be made of molded plastic material if desired and in this member are vertical ducts 61 provided with beveled or flared mouth portions 62. Laid upon the upper surface of member 20 and extending partially into the mouths 62 is a thin layer of suitable packing material indicated at 63 and on top of this packing material is the lower rigid coupling member 22. At its lower surface this member 22 has downwardly extending beveled portions 64 adapted to engage in the mouths 62, these beveled portions being in association with ports 65 of member 22. The packing material 63 is laid over a lower inturned flange 66 of the shell 21 and the member or block 22 is set in over the packing.

The packing material 63, the member 22, and the shell 21 are held firmly on member 20 by means such as screws 67 having threaded shanks 68 engaging threaded sockets 69 in member 20. The shanks of these screws pass through perforations in the packing layer and in the inturned flange 66, and are received in bores 70 of member 22 in which bores the heads of the screws are counter-sunk. The screws 67 hold the member 22 tightly in position so that there is no leakage of air passing between ports 61 and 65.

The manner of connecting and disconnecting the parts of the coupling will be clear for the most part from the foregoing description. It should be pointed out, however, that prior to coupling the two members together the soft rubber nipples which, in this instance, are carried by the upper member have their lower projecting ends free from pressure but when the upper member is forced down on the lower one of these nipple portions are placed under strain in order to create tight seals between them and the member or block 22. For this purpose the block 22 in the form shown has the upper end portions of its ports 65 provided with upwardly projecting sleeves 71, best shown in Fig. 5, these sleeves having external conical surfaces 72 adapted to be contacted by the conical inner surfaces 44 of the nipple ends. As the two coupling members are brought together in an axial direction, the projecting nipple ends are placed under compression in an axial direction so as to hold them in very tight sealing contact with the mating projections of block 22 and thereby prevent any leakage of air (or other fluid) at these points. The free nipple ends are held under this strong compression by the action of the resilient locking members engaging over the upper or rear face of the shoulder with which the lower part of the upper coupling member is provided.

When the aviator desires to disconnect the tubes, for example as a preparation for bailing out, it is merely necessary for him to exert a strong pull in an upward direction on the tubes. If the aviator is in a sitting position it is merely necessary for him to rise from his seat in order to accomplish this result, provided, of course, that when he is in the sitting position the tubes pass in a substantially straight line to the lower coupling member so as to be easily susceptible to upward tension. The pull on the tubes is transmitted from collar 26 to the elastic jacket and from the lower end of this jacket to the member 23 and as the jacket is tough and strong it transmits the strain from the tubes as a unit to member 23 without any appreciable strain being imposed upon those portions of the tubes which are below the collar 26 and are used for making the air connections. The lower portions of the tubes which are fitted over the sleeves 31 are free from tension or substantially free from tension when the jacket 24, being subjected to the upward pull, is slightly elongated, and there is therefore no harmful strain on the lower ends of the individual tubes slipped over the sleeves 31, and the air connection at this point is therefore maintained in an effective manner and the tube ends relieved of wear.

It will be apparent from the foregoing description that by my invention a coupling is provided whereby a supply of air or other fluid can be furnished to or received from the aviator's individual equipment without leakage, although the coupling is disconnectible in a very ready manner when it is desired to disconnect it. It will also be apparent that the improved connector is of such character and structure as to withstand hard usage.

While it is preferred to have the projecting elastic nipple ends carried by the movable member of the coupling as in the example illustrated, these elements can, if desired, be associated with the fixed member and the mating elements with the movable member.

The invention has been described in connection with a coupling involving three hose or tube members but the number is susceptible of considerable variation and, in some cases, a single hose can be employed.

It is to be understood that many changes in the organization of parts and in the details are within the principles of the invention and the scope of the claims.

What I claim is:

1. In a hose coupling, the combination of two ported members adapted to be brought axially into close association for forming a seal, and means for holding them in such association, one of said members having a soft elastic nipple projecting axially from an end portion thereof and adapted for axial compression and the other member having an axially projecting portion entering the nipple and holding it under axial compression, said nipple having a transverse carrying web interposed between parts of said first member.

2. In a hose coupling, two members adapted to be brought into association axially, each having a series of ports arranged side by side, the ports of one adapted to register with those of the other, and means for sealing the two members together in leak-proof association comprising projecting soft elastic nipples carried by one member and projecting hard portions carried by the other member adapted to enter the ends of the nipples and subjecting the nipples to axial compression for sealing purposes, all of said nipples being formed as integral parts of a web held between parts of the member carrying the nipples.

3. In a hose coupling, a ported member, a second ported member, said members being relatively movable axially to bring their respective ports into registry and sealing relation, an elastic tube connected to one of said members on the rear side and communicating with its port, a collar or abutment carried by the tube, and a jacket slipped over the tube and held against said collar and having a forward end portion secured to the last-mentioned ported member.

4. In a hose coupling, the combination of a plurality of elastic tubes arranged side by side, an abutment rigidly interconnecting said tubes in a group and located at some distance from certain ends of said tubes, a ported coupling member, means of connection between said ends of said tubes and said coupling member whereby communication is established, and a jacket having a wall through which the tubes extend, said wall being disposed against said abutment, said jacket extending forwardly over the ends of the tubes and to said coupling member and being secured to said coupling member in a manner to impose pull thereon.

5. In a hose coupling, the combination of a plurality of elastic tubes arranged side by side, an abutment rigidly interconnecting said tubes in a group and located at some distance from certain ends of said tubes, a ported coupling member, means of connection between said ends of said tubes and said coupling member whereby communication is established, and a jacket having a wall through which the tubes extend, said wall being disposed against said abutment, said jacket extending forwardly over the ends of the tubes and to said coupling member and being secured to said coupling member in a manner to impose pull thereon, the connection between the tube ends and the first ported member being effected by the tube ends being disposed over sleeves projecting from said ported member.

6. In a hose coupling, the combination of a plurality of elastic tubes arranged side by side, an abutment rigidly interconnecting said tubes in a group and located at some distance from certain ends of said tubes, a ported coupling member, means of connection between the ends of said tubes and said coupling member whereby communication is established, and a jacket having a wall through which the tubes extend, said wall being disposed against said abutment, said jacket extending forwardly over the ends of the tubes and to said coupling member and being secured to said coupling member in a manner to impose pull thereon, the connection between the tube ends and the first ported member being effected by the tube ends being disposed over sleeves projecting from said ported member, the means of connection between the jacket and the ported member including an open mouth portion of the jacket in interlocking engagement with said member.

7. In a hose coupling, the combination of a fixed base member having a plurality of ducts, a shell secured to said member around said ducts and providing an upwardly facing socket, a fixed member in the bottom of the socket having ports registering with said ducts, a member having ports adapted to register with those of said first ported member and adapted to be received within the upper portion of the socket, means in association with the socket for locking said ported members together, a plurality of tubes of flexible material, and means for connecting said tubes to the upper ported member.

8. In a hose coupling, the combination of a fixed base member having a plurality of ducts, a shell secured to said member around said ducts and providing an upwardly facing socket, a fixed member in the bottom of the socket having ports registering with said ducts, a member having ports adapted to register with those of said first ported member and to be received within the upper portion of the socket, means in association with the socket for locking said ported members together, a plurality of tubes of flexible material, and means for connecting said tubes to the upper ported member, said last-named means including a strain-relieving jacket of elastic material secured to the upper ported member and having an upper end engaged with a shoulder member on the tubes.

9. In a hose coupling, the combination of a base member provided with ducts, an upstanding shell fixed to the base member, a lower ported member fixed in the shell, a plurality of flexible tubes, an upper ported member attached to the tubes adapted to be received in the shell, interfitting elements which are of soft and hard material respectively carried by the ported members for effecting sealing between the respective ports, and means including parts associated respectively with the shell and the upper ported member for holding the ported members in the sealing position.

10. In a hose coupling, the combination of a disk-like member having ports located laterally of each other and extending therethrough, means for locking one face of said member in sealing relation to a similar ported member in registry therewith, a plurality of flexible tubes connected to said first member at the other face thereof so as to be in communication with its respective ports, and strain-relieving means in association with said tubes for relieving strain when the tubes are pulled for causing disengagement of the coupling, comprising an elastic jacket having a mouth portion secured to the peripheral part of the first member and an element rigid with the tubes which transmits pulling strain to said jacket.

PAUL S. MADSEN.